United States Patent
Almkvist et al.

(10) Patent No.: US 11,724,686 B2
(45) Date of Patent: Aug. 15, 2023

(54) METHOD OF REDUCING COLD START EMISSIONS IN HYBRID ELECTRIC VEHICLES

(71) Applicant: Volvo Car Corporation, Gothenburg (SE)

(72) Inventors: Göran Almkvist, Lerum (SE); Markus Ekström, Spekeröd (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/729,109

(22) Filed: Apr. 26, 2022

(65) Prior Publication Data

US 2022/0348186 A1   Nov. 3, 2022

(30) Foreign Application Priority Data

Apr. 29, 2021 (EP) .................................... 21171207

(51) Int. Cl.
  *B60W 10/06* (2006.01)
  *B60W 20/16* (2016.01)
  (Continued)

(52) U.S. Cl.
  CPC ............ *B60W 20/16* (2016.01); *B60W 10/06* (2013.01); *B60W 10/08* (2013.01);
  (Continued)

(58) Field of Classification Search
  CPC ..... B60W 10/06; B60W 20/16; F02D 41/024; F02D 41/0245; F02D 41/0255;
  (Continued)

(56) References Cited

U.S. PATENT DOCUMENTS 6,470,985 B1   10/2002  Inada et al.
7,128,052 B1*  10/2006  Reed .................... F02D 41/0002
                                                   123/90.15
(Continued)

FOREIGN PATENT DOCUMENTS

EP   1327759 A2    7/2003
EP   1464799 A1   10/2004
JP   H05328528 A  12/1993

OTHER PUBLICATIONS

Oct. 13, 2021 European Search Report issued in Corresponding International Application No. 21171207.0.

*Primary Examiner* — Erick R Solis
(74) *Attorney, Agent, or Firm* — Clements Bernard Walker; Christopher L. Bernard

(57) ABSTRACT

A method of reducing cold start emissions in a series mode hybrid electric vehicle, including an internal combustion engine with an exhaust duct having a catalyst and a downstream oxygen sensor, an output of the combustion engine being connected to an electric generator with a power output of at least 10 kW that is connected to an electric motor which is coupled to a drive shaft of two or more wheels. The method includes detecting a cold start condition, injecting fuel into the engine such that combustion at a lambda value, λ, is achieved for which λ>1, running the engine at a speed of 1000 rpm or higher, determining if the efficiency of the catalyst reaches a first level, setting λ to about 1 after the predetermined efficiency level of the catalyst has been reached, and reducing the speed to working conditions when the catalyst efficiency reaches a second level.

10 Claims, 2 Drawing Sheets

(51) Int. Cl.
*F02D 41/02* (2006.01)
*B60W 10/08* (2006.01)
*F02D 13/02* (2006.01)
*F02D 41/06* (2006.01)
*F02D 41/40* (2006.01)
*F02P 5/15* (2006.01)

(52) U.S. Cl.
CPC ....... *F02D 13/0215* (2013.01); *F02D 41/024* (2013.01); *F02D 41/0245* (2013.01); *F02D 41/0255* (2013.01); *F02D 41/064* (2013.01); *F02D 41/401* (2013.01); *F02P 5/1506* (2013.01); *F02D 2041/026* (2013.01); *F02D 2200/08* (2013.01); *F02D 2200/101* (2013.01)

(58) Field of Classification Search
CPC ............. F02D 41/064; F02D 2041/026; F02D 2200/0802; F02D 2200/0804
USPC ................ 701/113; 60/284; 123/339.24, 491
See application file for complete search history.

(56) References Cited

U.S. PATENT DOCUMENTS

| | | | |
|---|---|---|---|
| 11,466,634 B1* | 10/2022 | Wooldridge | F02P 5/1512 |
| 2004/0237510 A1* | 12/2004 | Kusada | F02D 13/0261 |
| | | | 903/917 |
| 2008/0066457 A1* | 3/2008 | Kim | B60K 6/48 |
| | | | 60/285 |
| 2012/0285142 A1* | 11/2012 | Shibata | F02D 41/1454 |
| | | | 60/276 |
| 2014/0007561 A1* | 1/2014 | Habu | B60W 10/06 |
| | | | 60/284 |
| 2017/0074176 A1 | 3/2017 | Yokoyama et al. | |
| 2017/0305411 A1* | 10/2017 | Leone | F02D 21/08 |
| 2019/0376461 A1* | 12/2019 | Martz | F02D 41/029 |
| 2020/0025119 A1* | 1/2020 | Nethercutt | F02B 37/22 |
| 2020/0224614 A1* | 7/2020 | Hu | F02B 37/10 |
| 2022/0219674 A1* | 7/2022 | Light-Holets | B60K 6/48 |

* cited by examiner

METHOD OF REDUCING COLD START EMISSIONS IN HYBRID ELECTRIC VEHICLES

CROSS-REFERENCE TO RELATED APPLICATION

The present disclosure claims the benefit of priority of co-pending European Patent Application No. 21171207.0, filed on Apr. 29, 2021, and entitled "Method of Reducing Cold Start Emissions in Hybrid Electric Vehicles," the contents of which are incorporated in full by reference herein.

TECHNICAL FIELD

The present disclosure relates to a method of reducing cold start emissions in a series mode hybrid electric vehicle, including an internal combustion engine with an exhaust duct having a catalyst and an oxygen sensor downstream of the catalyst, an output of the combustion engine being connected to an electric generator that is connected to an electric motor which is coupled to a drive shaft of two or more wheels, the method including the step of detecting a cold start condition and operating the engine to cause rapid heating up of the catalyst.

The present disclosure also relates to an electronic control unit and to a hybrid electric vehicle having an electric control unit configured for carrying out the method.

BACKGROUND

It is known to reduce tailpipe emissions in hybrid electric vehicles having a three-way catalyst, by utilizing the vehicle's electric motor/generator to transfer a negative torque to the internal combustion engine during cold-start conditions. The increased load on the internal combustion engine results in rapid heating up of the catalyst and reduces its light-off time, the moment when the catalyst reaches 50% of its efficiency. In addition to reducing the light-off time of the catalyst, altering the air fuel ratio and retarding the spark timing are used to reduce emissions of nitrogen oxides (NOx), carbon monoxide (CO) and unburned hydrocarbons (HC). The torque that is exerted by the generator on the internal combustion engine is slowly lowered to maintain the air-fuel ratio close to stoichiometric proportions, i.e., to a lambda value about equal to 1.

It is an object of the present disclosure to provide a method of operating a hybrid electric vehicle having an internal combustion engine (ICE) and a generator with a relatively large power output in series mode under cold start conditions with relatively low emissions.

It is a further object of the present disclosure to provide a control strategy for operating a hybrid electric vehicle under cold-start conditions, in which the catalyst reaches its full light-off temperature relatively rapidly and maintains a steady operation.

SUMMARY

Herein the method according to the disclosure includes the steps of:
 detecting a cold start condition,
 injecting fuel into the combustion engine such that combustion at a lambda value, $\lambda$, is achieved for which $\lambda>1$, preferably $1<\lambda<2$, more preferably at a $\lambda$ of about 1.4,
 running the combustion engine at a speed of 1000 rpm or higher, preferably $1500<rpm<4000$, more preferably at a speed of about 2500 rpm,
 determining if the efficiency of the catalyst reaches a predetermined first level,
 setting $\lambda$ to about 1 after the predetermined efficiency level of the catalyst has been reached, and
 reducing the engine speed to working conditions when the catalyst efficiency reaches a predetermined second level.

By running the HEV in series mode and utilizing the high power generator, such as an integrated starter generator (ISG) having a power output of at least 10 kW, to take up the relatively high power output of the ICE at start up, a very rapid light off of the catalyst can be obtained. The rapid catalyst light-off in combination with a very lean lambda, results in reduced NOx emissions. This contrasts with the known methods of utilizing low speed and low load conditions in a mild hybrid vehicle at richer lambda values.

In an embodiment of a method according to the disclosure, when the predetermined first efficiency level of the catalyst is reached, for instance at the start of light-off, the $\lambda$ value is reduced stepwise to a value $\lambda<1$, preferably about 0.8, and is within 10 s, preferably within 5 s, more preferably within 2 s set to $\lambda=1$.

After the start of the light-off of the catalyst, the lambda value of the air/fuel mixture is stepped down from a lean to a rich value, to quickly set the oxygen buffer in the catalyst into working conditions. Directly following, lambda is set to normal stoichiometric conditions, $\lambda=1$. This avoids an NOx slip during the lambda transient. HC and CO are converted because of the full oxygen buffer in the catalyst.

Immediately after detecting a cold start condition, the electric generator according to the disclosure may provide rotation of the combustion engine at a speed of between 1500 and 4000 rpm or more during a time less than 1 s, preferably less than 0.1 s. The fast rev up of the ISG allows only 1 cylinder to pump out internal scrap gases.

An embodiment of a method according to the disclosure may include the steps of:
 setting late exhaust valve timing EVT and late inlet valve timing IVT, and
 injecting fuel into the first possible cylinder firing, at a relatively high injection pressure.

Setting late exhaust variable valve timing (VVT) to exhaust valve opening (EVO) achieves an afterburning of HC/CO. Late exhaust valve closing (EVC), at for instance 10-30° after top dead center (ATDC), maintains HC-rich oil scrap contained in the cylinder.

In a method according to the disclosure, fuel is injected in the cylinder early at 180-0° before top dead center (BTDC), preferably about 90° BTDC.

The timing of the fuel injection is early for enough air/fuel preparation but avoids fuel from hitting the cylinder/piston walls.

During the lean combustion at $\lambda>1$, the ignition may be retarded, preferably at a maximum brake torque value of $-30°<MBT<-10°$, preferably a MBT of about $-20°$. This maintains a stable combustion while avoiding high peak temperatures that produce NOx.

Upon detection of a cold start condition, a throttle of the combustion engine may be opened so that minor throttling at the target speed occurs, a throttle pressure being smaller than −5 kPa.

At engine stop, the combustion engine is stopped without throttling the manifold pressure. This avoids oil entering during the cylinder induction stroke. As the last rotations during start result in high compression forces and give rise to relatively intense vibrations, The ISG is operated to reduce noise, vibrations and harshness (NVH).

The start-stop function of the combustion engine will become active when the ICE has sufficiently heated up and the catalyst is fully active, which may be a few minutes after cold start.

BRIEF DESCRIPTION OF THE DRAWINGS

An embodiment of a method for reducing exhaust gas emissions under cold start conditions will, by way of non-limiting example, be explained in detail with reference to the accompanying drawings. In the drawings.

DETAILED DESCRIPTION OF EMBODIMENTS

Figure 1:
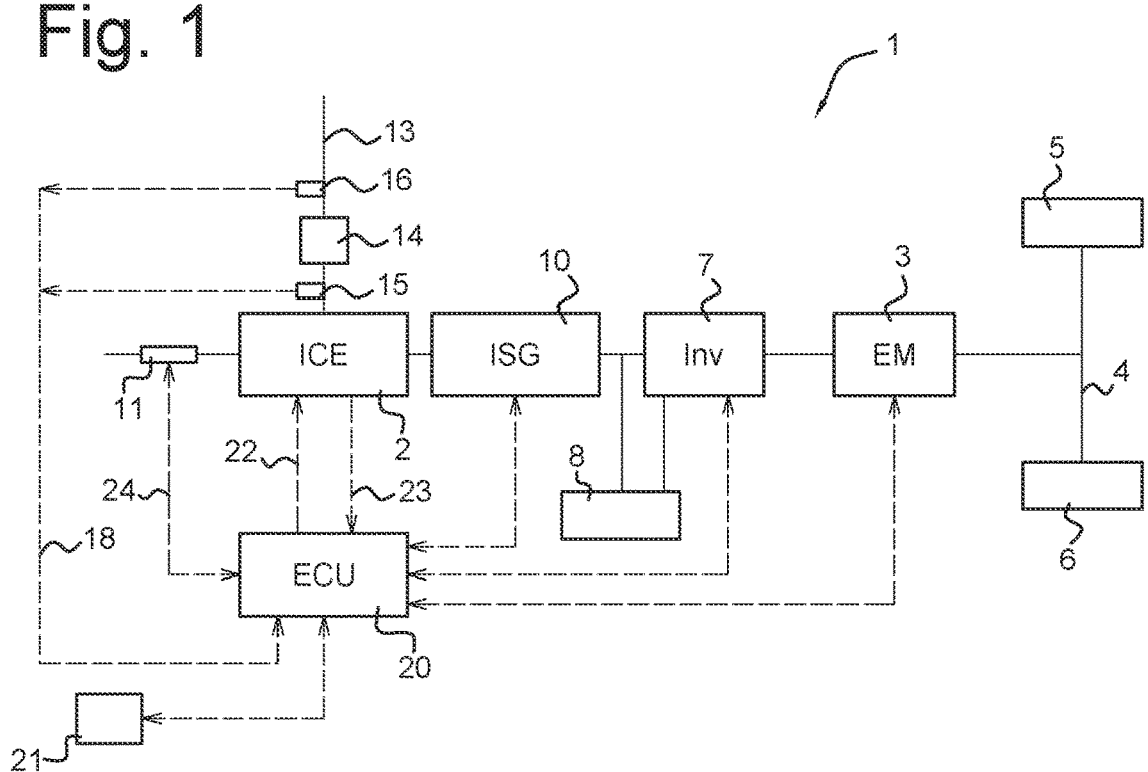
FIG. 1 shows a schematic lay-out of a series mode hybrid vehicle according to the present disclosure, FIG. 2 show a flow chart of the control steps of the electric control unit according to the disclosure.

FIG. 1 shows a schematic lay-out of a series mode hybrid electric vehicle (HEV) 1 having an internal combustion engine (ICE) 2 that is with its output shaft coupled to an integrated starter/generator (ISG) 10. The starter generator 10 is with an output connected to an electric energy storage device 8, which may be a battery or a fuel cell, and is connected to an inverter 7. The inverter 7 converts the voltage derived from the generator 10 or the high DC voltage at the output of the battery 8, into the required 3 phase alternating voltage that is suitable for driving the electric motor 3. The output of the electric motor 3 is coupled to a drive train 4 which may include differential gears and that drives wheels 5 and 6.

The operation of the combustion engine 2, the generator 10, the inverter 7 and the electric motor 3 is controlled by an electronic control unit (ECU) 20 that is connected to the respective units through control lines 18, 22, 23 and 24 such as an CAN-bus network. The ECU 20 includes microprocessors and memory units for the execution of vehicle control algorithms and receives user commands from a driver control unit 21, which may include an accelerator pedal and a brake pedal. The ECU 20 provides, on the basis of the user commands that are received from the control unit 21, control signals to the engine 2, generator 10, inverter 7 and electric motor 3 for providing the required torque output of the electric motor to the wheels 5,6.

The combustion engine 2 receives air through a throttle 11 and emits exhaust gasses through an exhaust duct 13. A catalytic converter 14, such as a three-way catalyst (TWC) is included in the exhaust duct 13 for the reduction of NOx in the exhaust gases and the oxidation of unburned hydrocarbons (HC) and carbon monoxide (CO). An upstream and a downstream exhaust gas oxygen sensor (EGO) 15, 16 determine the amount of oxygen in the exhaust gas prior to an after passing the catalytic converter 14 and send sensor signals to the ECU 20 along a signal line 18. The oxygen sensors 15, 16 allow the ECU to meter the air that is supplied to the engine 2 via the throttle 11 and the fuel that is injected into the cylinders of the engine to run the engine 10 at, or close to, stoichiometric fuel mixtures, i.e., at air-fuel ratios for which the lambda value, $\lambda$ equals 1.

The catalytic converter 14 needs to heat up to reach its optimal efficiency and reaches 50% of its full efficiency at so-called "light-off". In a combustion engine, the light-off time may range from 10-25 s. In a mild hybrid electric vehicle having a low ISG brake potential, the light-off time can be 8-20 s and in a full hybrid vehicle according to the disclosure having a high power ISG, the light-off time can be between 2 s and 5 s.

The control unit 20 receives engine condition signals along the signal line 23, such as speed and temperature of the engine 2. When a cold-start condition is detected by the control unit 20, which may for instance be determined by a low temperature of the engine 2 and/or by the time the engine 2 has been idle, the control unit will start a cold start a series of commands that light off the catalyst 14 as fast as possible, while minimizing emissions during light-off.

First, the control unit 20 opens the throttle 11 so that minor throttling occurs at the target speed. The pressure at the throttle is kept at a low level, generally below −5 kPa.

In a second step, the starter/generator 10 is brought rapidly to high rotational speeds, using electric power input from the battery 8, which is imparted to the cylinders of the engine 2 to avoid internal scrap gases in the cylinders of the engine 2. Typically, the speed is 1000 rpm in a time interval t of less than 0.1 s. This allows only a single cylinder in the engine 2 to pump out internal scrap gases.

Thirdly, a waste gate opening may be applied to avoid turbo fluctuation. The high braking power that is provided by the ISG may, in case a turbo is present, cause a high flow of enthalpy to the turbine that consequently starts to build up boost, which is controlled by the waste gate opening.

As a fourth step, the valve timing of the cylinders of the engine 2 is set to late variable valve timing (VVT) for opening of the exhaust valves (EVO) and for closing of the exhaust valves (EVC), to for instance 10-30° after top dead center (ATDC). This prolongs afterburning of HC and CO in the cylinders. The late exhaust valve closure contains HC rich oil scrap in the cylinders.

Fifth, the inlet valve timing is adjusted to late inlet variable valve timing (VVT) and the inlet valve opening IVO is set 10-30° after top dead center (ATDC).

Step six involves the control unit 20 injecting fuel into the first cylinder that is ready to fire, at maximum injection pressure, to avoid oil scrap.

Next, step seven includes setting an early timing of the injection of fuel into the cylinders of the engine 2, at 180-0° before top dead center (BDC), for instance about 90° BTDC. This provides a sufficient amount of air/fuel mixture but prevents fuel hitting the cylinder/piston walls.

In step eight, fuel is injected into the cylinders at lean air/fuel ratios. This results in burning of the hydrocarbons HC and particulate matter, PN, at low enough combustion temperatures to avoid formation of NOx. The air/fuel ratios are set to $1.0<\lambda<2.0$, for instance a lambda of about 1.4.

In step nine, the control unit 20 retards the ignition of the cylinders of the engine 2 for keeping a stable combustion while avoiding high peak temperatures that produce NOx. The ignition may be retarded to −30°/−10° from maximum brake torque (MBT) for instance at MBT-20°.

In the next step ten, the control unit 20 increases the speed of the combustion engine 2 to heat up the catalyst 14 via heat exchange with the hot exhaust gases, at speeds of 1500-4000 rpm, for instance about 2500 rpm dependent on heat flow and noise, vibration and harshness (NVH) conditions.

In step eleven, it is detected by the control unit 20 when the sensor signals of oxygen sensors 15, 16 reach a predetermined threshold value. This indicates that the catalyst 14 starts to light-off. The control unit 20 reduces the lambda value of the air/fuel mixture that is injected into the cylinders of the combustion engine 2 to a rich value of $\lambda<1$, for example to a lambda value of about 0.8. This quickly sets the oxygen buffer in the catalyst 14 in working conditions. Immediately afterwards, $\lambda$ is brought back to normal conditions of lambda=1. This brief downward dip in the $\lambda$ value, which may last less than 2 s, for instance a few tenth of a second, returns the catalyst from an oxygen-rich state during lean combustion, to its active working conditions. NOx emission is reduced during the lambda transient. HC and CO are converted in the catalyst because its oxygen buffer is filled.

In step twelve, catalyst heating is terminated when the sensor signals of oxygen sensors 15, 16 reach a second threshold value, indicating light-off of the catalyst 14 when it reaches its near full efficiency. This may be 5-20 s after the start of step 1, for instance 10 s in which the catalyst reaches a temperature of 250° C.

In step thirteen, in case of engine stop, the manifold pressure in manifold 11 is not throttled to ensure that no oil is entered in the induction or intake stroke of the cylinders. The control unit 20 may activate the ISG 10 to avoid noise, vibrations or harshness (NVH).

Figure 2:
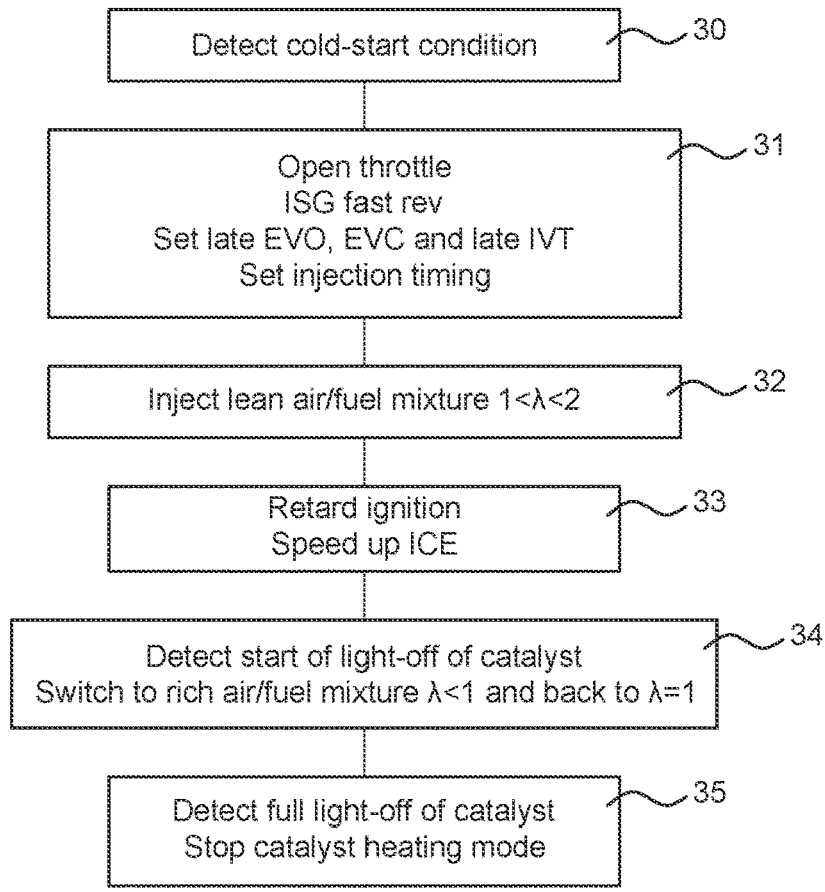

FIG. 2 schematically shows the cold start routine that is executed by the control unit 20. After detection of a cold start condition at 30, block 31 of the cold start routine executes steps 1 to 7 described above. The throttle 11 is opened, the internal starter/generator 10 is operated and the variable valve timing VVT of the cylinders in the combustion engine 2 is adjusted for preparing injection of a lean air fuel mixture in next step 32, while the catalyst 14 is relatively cold and below its light-off temperature. Exhaust of scrap gases is hereby reduced.

After injection of the lean air fuel mixture at 32 (step eight), the ignition is retarded and the ICE 2 is speeded up in block 33 (steps nine and ten).

In block 34 (step eleven), while the temperature of the catalyst increases, the control unit 20 determines on the basis of the signals of the oxygen sensors 15,16 if light-off of the catalyst 14 has started. After light-off of the catalyst 14, the control unit 20 injects a rich air/fuel mixture into the cylinders of the engine 2, for a duration of less than 2 s, that returns the oxygen buffer of the catalyst to its active operating window and next returns to an air-fuel mixture with a lambda value $\lambda=1$.

In block 35 (step twelve), the control unit 20 determines if the catalyst 14 has reached near full light-off temperature at which it operates at a high efficiency, and then reduces the speed of the engine to match regular driving conditions.

The start of a new cold start cycle will be determined for instance by the catalyst cooling temperature, and may be required after the internal combustion engine has been stopped for instance for 10 minutes or more, depending on ambient temperatures.

Figure 3:
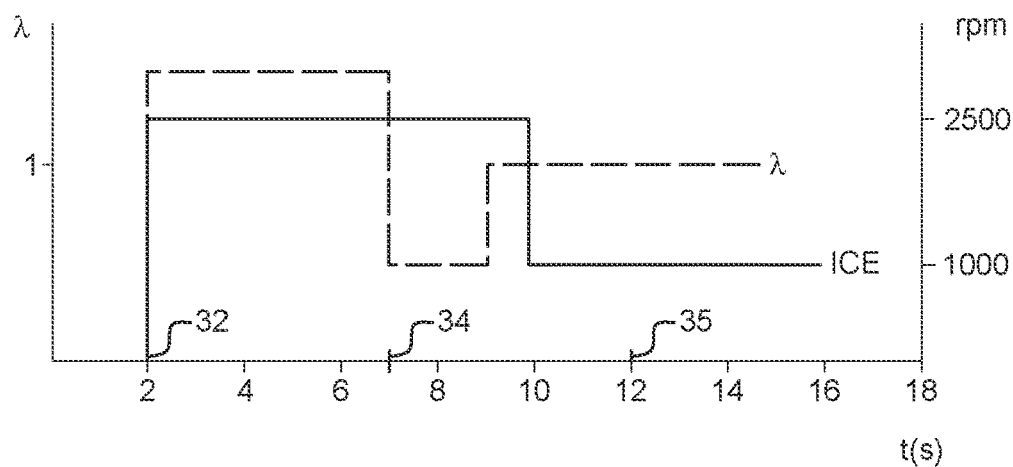
FIGS. 3 and 4 show the lambda value and the speed of the internal combustion engine and integrated starter/generator.
Figure 4:
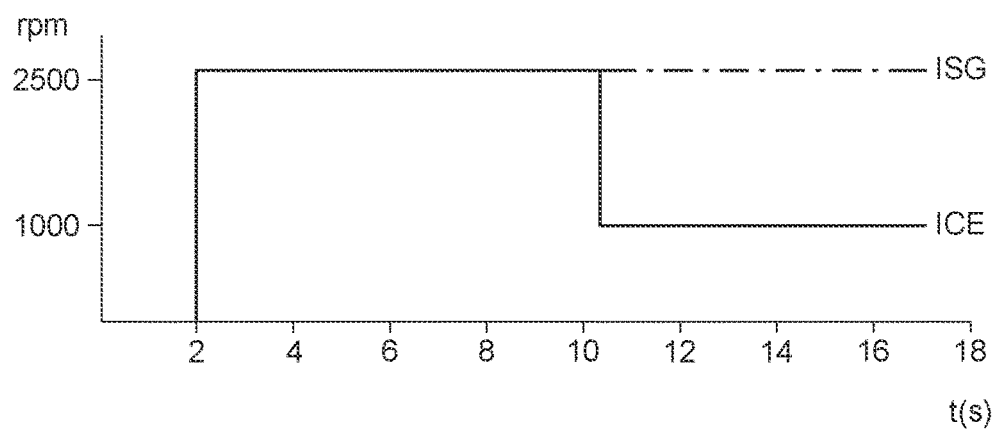
Figure 5:
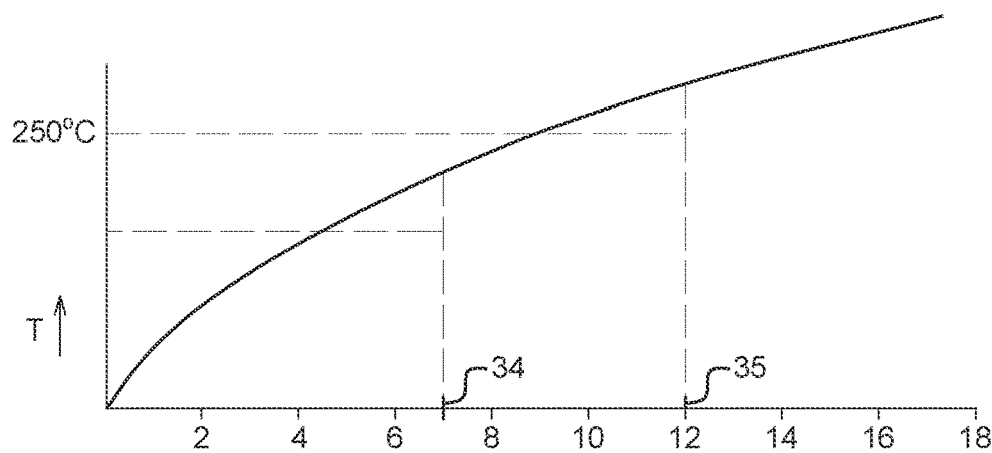
FIG. 5 shows the temperature of the catalyst after cold start.

FIGS. 3 and 4 schematically show the timing of the lambda value of the air-fuel mixture that is injected into the cylinders of the ICE, the speed of the ICE and the speed of the ISG. FIG. 5 schematically shows the catalyst temperature that results from the engine control by the control unit 20, after starting the cold start procedure according to the disclosure. In this example, the fuel injection of control step 32 of the routine of FIG. 2 starts at t=2 s, the stepwise reduction in the lambda value of the air-fuel mixture (flowchart part 34) from a value of 1.4 to 0.8 occurs at 7 s and the return of lambda to a stoichiometric value $\lambda=1$ occurs at 9 s. At 10 s the velocity of the ICE returns to regular driving conditions, while the ISG continues to run at a velocity of 2500 rpm.

What is claimed is:

1. A method of reducing cold start emissions in a series mode hybrid electric vehicle comprising an internal combustion engine with an exhaust duct having a catalyst and an oxygen sensor downstream of the catalyst, an output of the combustion engine being connected to an electric generator with a power output of at least 10 kW that is connected to an electric motor which is coupled to a drive shaft of two or more wheels, the method comprising the steps of:
    detecting a cold start condition,
    injecting fuel into the combustion engine such that combustion at a lambda value, $\lambda$, is achieved for which $\lambda>1$,
    running the combustion engine at a speed of 1000 rpm or higher,
    determining if the efficiency of the catalyst reaches a predetermined first level,
    setting $\lambda$ to about 1 after the predetermined efficiency level of the catalyst has been reached, and
    reducing the engine speed to working conditions when the catalyst efficiency reaches a predetermined second level.

2. The method according to claim 1, wherein when the predetermined efficiency of the catalyst is reached, the $\lambda$ value is reduced stepwise to a value of $\lambda<1$, and is within 10 s set to $\lambda=1$.

3. The method according to claim 1, wherein after detecting a cold start condition, the electric generator provides rotation of the combustion engine at a speed of 1500 rpm or more during a time less than 1 s.

4. The method according to claim 1, further comprising the steps of:
    setting late exhaust valve timing EVT and late inlet valve timing IVT, and
    injecting fuel into the first possible cylinder firing, at a relatively high injection pressure.

5. The method according to claim 4, further comprising injecting fuel in the cylinder early at 180-0° before top dead center, BTDC.

6. The method according to claim 1, wherein during the combustion at $\lambda>1$, the ignition is retarded, at a maximum brake torque value of $-30°<MBT<-10°$.

7. The method according to claim 1, wherein at detection of a cold start condition, a throttle of the combustion engine is opened so that minor throttling at the target speed occurs, a throttle pressure being smaller than $-5$ kPa.

8. The method according to claim 1, wherein at engine stop, the combustion engine is stopped without throttling the manifold pressure.

9. An electronic control unit for use in a hybrid electric vehicle, comprising one or more electronic memory units and processing units that are configured for carrying out the method steps comprising:
    detecting a cold start condition,
    injecting fuel into a combustion engine such that combustion at a lambda value, $\lambda$, is achieved for which $\lambda>1$,
    running the combustion engine at a speed of 1000 rpm or higher,
    determining if the efficiency of a catalyst reaches a predetermined first level,
    setting $\lambda$ to about 1 after the predetermined efficiency level of the catalyst has been reached, and
    reducing the engine speed to working conditions when the catalyst efficiency reaches a predetermined second level.

10. A hybrid electric vehicle having an internal combustion engine with an exhaust duct having a catalyst and an oxygen sensor downstream of the catalyst, an output of the combustion engine being connected to an electric generator that is connected to an electric motor which is coupled to a drive shaft of two or more wheels and a motor control unit connected to the combustion engine and to the electric motor for controlling the injection of fuel into the cylinders of the combustion engine and for the operation of the electric motor, the control unit being configured for carrying out the method steps comprising:

detecting a cold start condition, injecting fuel into the combustion engine such that combustion at a lambda value, $\lambda$, is achieved for which $\lambda > 1$, running the combustion engine at a speed of 1000 rpm or higher, determining if the efficiency of the catalyst reaches a predetermined first level, setting $\lambda$ to about 1 after the predetermined efficiency level of the catalyst has been reached, and reducing the engine speed to working conditions when the catalyst efficiency reaches a predetermined second level.

\* \* \* \* \*